Figure 3:
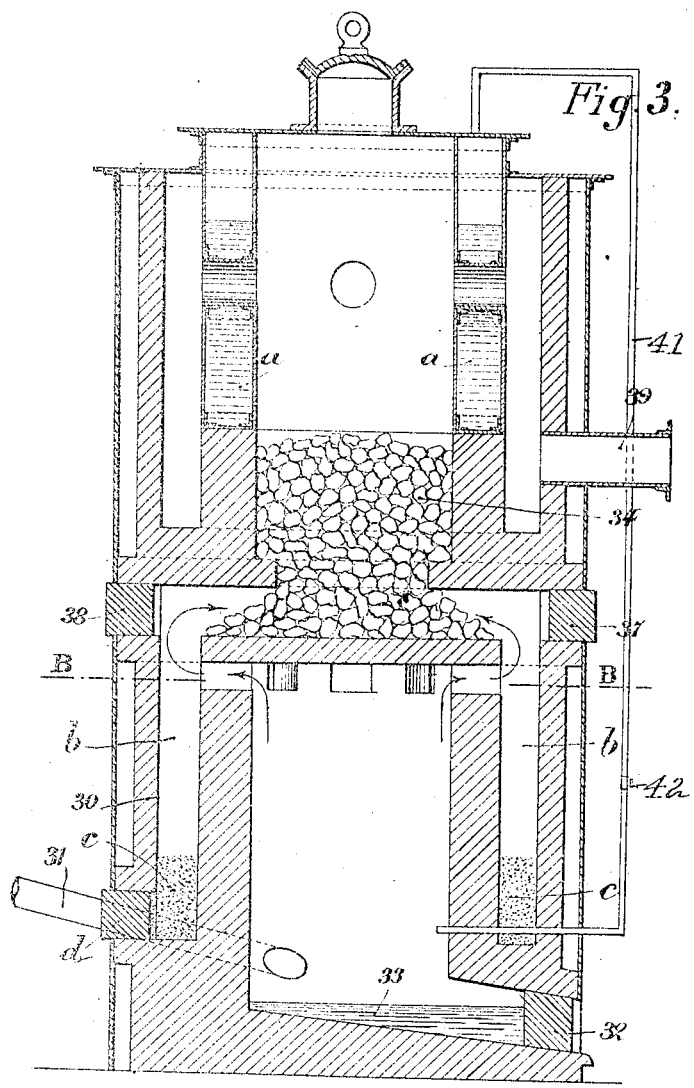

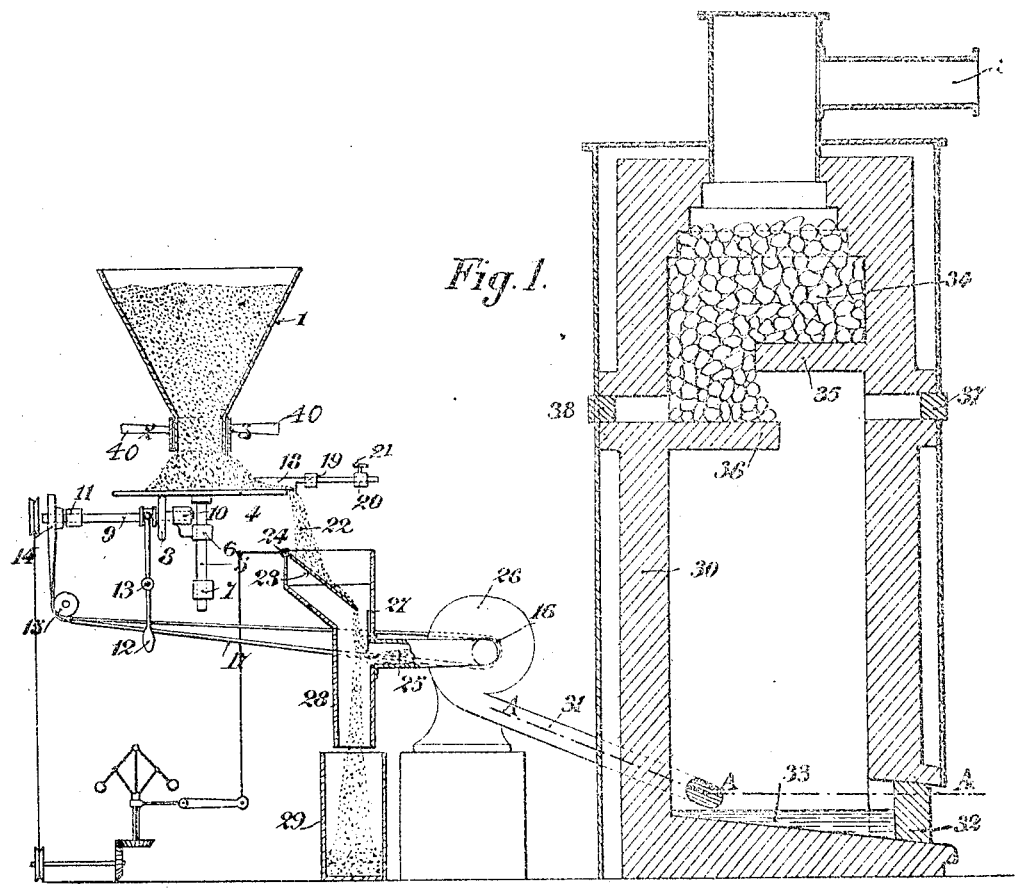

G. MARCONNET.
GAS PRODUCING APPARATUS.
APPLICATION FILED SEPT. 16, 1907.
906,441.
Patented Dec. 8, 1908.
3 SHEETS—SHEET 3.
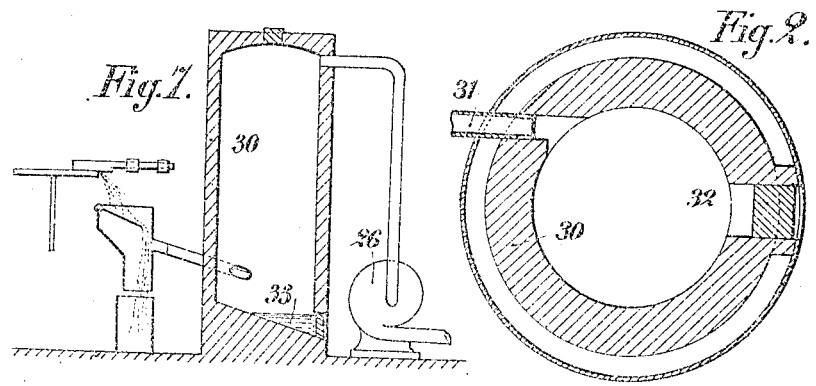
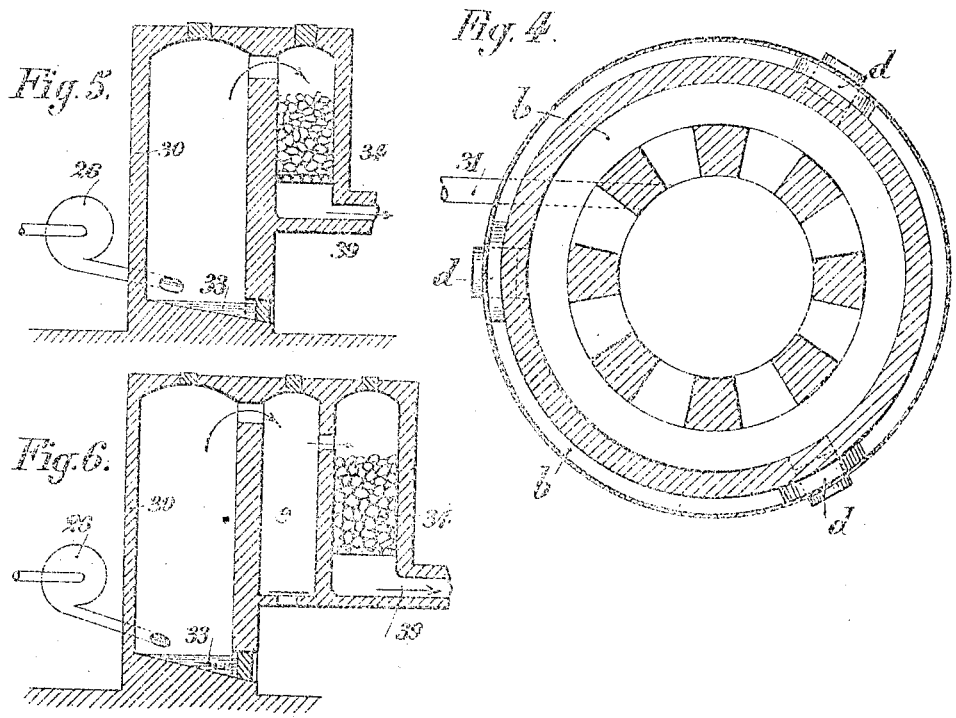
WITNESSES
Alvin J. White
W. P. Burke
INVENTOR
GEORGES MARCONNET
M. Millan Hutt
ATTY

UNITED STATES PATENT OFFICE.

GEORGES MARCONNET, OF PARIS, FRANCE.

GAS-PRODUCING APPARATUS.

No. 906,441.   Specification of Letters Patent.   Patented Dec. 8, 1908.

Application filed September 16, 1907. Serial No. 393,192.

*To all whom it may concern:*

Be it known that I, GEORGES MARCONNET, a citizen of the Republic of France, residing at Paris, France, have invented Improvements in Gas-Producing Apparatus, of which the following is a specification.

This invention has for its object to provide gas producing apparatus suitable for the production of a combustible gas, adapted for heating purposes or for motive force, from small combustibles of low price.

The combustible before being admitted into the gas generator proper is reduced to fine powder in suitable apparatus. This fine powder is burned in the gas generator in the presence of a quantity of air which is so proportioned that the gas produced shall be rich in oxid of carbon and in hydrogen. The combustion is effected in such a way that the operation of cleaning may be easily carried out; in reality the usual cleaning operation is replaced by a tapping off of vitreous clinker the temperature obtained and the form of the apparatus being such that the production of tars is avoided. The gases obtained only require to be washed to be freed from dust.

The apparatus comprises a gas generator proper consisting of a vertical tower of masonry into the lower part of which a very intimate and well stirred mixture of fine coal in the form of flour and air is forced as by means of a blower. The apparatus also comprises means connected with the blower whereby the pulverulent combustible is supplied thereto in variable quantities controlled by the speed of the blower itself.

Figure 1 of the accompanying drawings shows in central vertical section the general arrangement of apparatus embodying this invention according to one construction. Fig. 2 is a horizontal section corresponding to the line A—A of Fig. 1. Fig. 3 shows in central vertical section a gas generator furnished with means for generating water vapor. Fig. 4 is a horizontal section corresponding to the line B, B of Fig. 3. Figs. 5, 6, and 7 are modifications shown in vertical section.

1 is a hopper in which is placed a quantity of powdered coal sufficient for a run or working period of some hours. In some cases the hopper may be supplied with fuel in a continuous or intermittent manner as by means of a screw conveyer or by any other well known device. The lower end of the hopper terminates in a cylindrical portion 2 which is open at its lower end and on which is mounted to slide with slight friction a cylindrical collar 3. Some centimeters below the cylindrical portion 2 is a horizontal plate 4 keyed upon a vertical shaft 5 which is mounted to turn in two bearings 6 and 7. The plate 4 bears upon a friction roller 8 arranged to slide upon a horizontal shaft 9 which is mounted to turn in two bearings 10 and 11. The roller 8 can be moved towards or away from the center of the plate 4 by means of a fork lever 12 pivoted at 13. In this way, for a constant speed of the shaft 9 there may be obtained a variable speed of the plate 4. The shaft 9 is driven from the blower 26 by belt pulleys 14, 15 and 16 and belt 17, so that its speed depends upon the speed of the blower. Powdered coal placed in the hopper 1 spreads itself out over the plate 4 in the form of a cone the wall of which is constantly sliding downwardly and the height and consequently also the diameter of which depend upon the distance between the bottom of the cylindrical collar 3 and the revolving plate 4. This distance is regulated by lowering or raising the cylindrical collar 3.

The plate 4 carries around with it a cone of powdered coal into which a small scraper 18 extends to a predetermined extent that is adjustable for which purpose the scraper is mounted to slide in two guides 19, 20 and can be locked in desired position by a clamping screw 21. Under the action of the scraper 18 and by the rotation of the plate 4 there is produced a stream 22 of powered coal the size of which increases according to the increase in speed of the rotating plate 4 and according to the extent to which the scraper 18 is engaged in the cone of powdered coal, and also according to any increase of the distance between the plate 4 and the cylindrical collar 3. As the scraper 18 removes the powdered coal more powdered coal slides down from the hopper 1 so that the cone of powdered coal on the rotary plate 4 is continually being reformed. A perfect form may be given to this cone of fuel by suitably arranging a fixed blade or strickle against which the wall of the cone rubs as the plate 4 rotates. The powdered coal falls from the plate 4 a certain distance in order to divide it more efficiently, onto an inclined plate 23 which may be arranged to turn about a shaft 24. Over this plate the powdered coal slides and falls from it in a sheet or shower of fine grains in front of the suction opening 25 of the blower 26. The mouth of the opening 25 may be more or less closed by means of an adjustable damper 27. The inclination of the plate 23 determines the quantity of powdered coal passing the suction opening 25. The particles of coal likely to be insufficiently burned through having too great weight, cannot be drawn in the opening 25 by the blower 26, so that they fall into a chute 28 and are received in a box 29 from which they are taken out at intervals to be reground.

The gas generator proper comprises a vertical tower of refractory masonry 30 to the lower part of which the injection nozzle 31 of the blower 26 blows in the intimate mixture of powdered coal and air in properly proportioned quantities. For the purpose of igniting the mixture in the generator some small pieces of ignited wood are passed therein through a door 32 which also serves for cleaning purposes and which after insertion of the ignited wood is closed and the hopper plate 4 and the blower 26 set in operation. The fine coal dust carried along by the air forms a cloud which inflames very readily on contact with the burning wood and thereby produces a powerful blowpipe jet under the influence of which the walls of the generator become rapidly heated to redness and the combustion then continues of itself. The combustion at the exit of the injection nozzle 31 is very energetic and rapid, the distillation of the hydrocarbons taking place instantaneously, and the lower part of the gas generator becomes rapidly raised to such a temperature that cinders, resulting from the combustion, which come into contact with the generator walls and are there liquefied and run down to the bottom of the apparatus where they form a pool 33 of slag which can be run out say every six or eight hours by opening the cleaning door 32. The slag may be rendered more or less fusible by the addition of a suitable flux added to the coal at the time of grinding or by a suitable flux in powdered form placed in the hopper 1 with the powdered coal.

It is important that the intimate mixture of coal dust and air made outside the gas generator shall continue during the combustion. For this purpose the supply nozzle 31 is arranged tangentially as shown in Fig. 2 so that the issuing fuel and air imparts a whirling motion to the gases.

At the commencement of a gas producing operation a certain quantity of carbonic acid gas is formed but as the temperature at the lower part of the gas generator soon reaches close upon 1500 to 1600 degrees C. this carbonic acid gas is dissociated so that the products of combustion which pass towards the top of the generator comprise oxid of carbon, hydrogen, and coke resulting from the combustion of the hydrocarbons and oxygen. As these products move towards the upper end of the generator the combustion of the coke is completed and the gases thereby become capable of use for heating purposes and for the production of motive power. When used for the production of motive power it is advantageous for the composition of the gas to be unvarying. To enable such gas to be produced and to guard against the effect of any irregularity in the distribution or any momentary lack of powdered coal the gas generated may be caused to traverse a reducing column consisting as shown in Fig. 1 of a quantity of coke 34 placed in pieces in the upper part of the apparatus and resting upon two baffle slabs 35 and 36. This coke can be inspected or poked through the two plugged holes 37 and 38. The gas leaves the generator by the pipe 39 which leads it to the apparatus wherein it is to be used.

With apparatus arranged as described and by reason of the high temperature at which the reaction takes place the tar is completely dissociated and there only remain in the gas produced traces of ammoniacal compounds so that such gas only requires washing to free it from dust before being used.

If to be used for the production of motive power it is advantageous for the gas to be rich in hydrogen; for this purpose water vapor may be injected into the generator at a point some centimeters above the injection nozzle 31 of the blower. This water vapor may be supplied from an independent source but it is preferable to produce it by means of a boiler $a$ located near the upper part of the gas generator as shown in Figs. 3 and 4. While the water vapor is being produced the gases cool down.

In gas generators constructed as described the cleaning is so easily effected that combustibles, like schists, containing 70% of cinders may be burned, but when a gas for motive power purposes is to be produced from similar combustibles the large quantity of cinders carried along in the ascending current of gas within the gas generator would choke up the intervals between the pieces of coke 34 and stop the working of the apparatus. To overcome such objection, with a combustible of this nature it is well to interpose between the coke 34 and the gas outlet 39 an annular chamber $b$, Fig. 3, which acts as a catch chamber and at the bottom of which the heavy cinders accumulate at $c$ whence they may be removed through plugged holes $d$.

The column of coke 34 may be arranged at the side of the gas generator 30 as shown in Fig. 5, or, in Fig. 6, which latter arrangement is especially suitable for combustibles containing a large amount of cinder and clinkers which are difficult to fuse. In Fig. 6, 30 represents the gas generator proper, e a dust chamber and 34 the reducing column.

In the arrangements described the air and powdered coal are delivered to the gas generator by means of a fan or blower 26 which blows the mixture into the gas generator. Such blower might be placed at the outlet of the gas generator as shown in Fig. 7 so as to draw the fuel in the gas generator by suction. In this case water may be injected into the mouth of the blower so that it fulfils at the same time the functions of a washer. In some cases when producing gas intended for motive power the blower 26 may be dispensed with and in such cases the piston of the gas motor would draw in the air and the coal dust so that the gas generator acts after the manner of a carbureter on a petrol motor; it would in such cases form a carbon carbureter.

With gas generating arrangements according to this invention carburation of the air supplied by the blower may be effected to an unvarying degree and in such way that when once regulated by hand the degree of carburation will remain constant whatever be the speed of the blower and consequently whatever be the quantity of air that the blower draws in. This may be readily effected by causing the shaft of the blower to rotate a centrifugal governor arranged to adjust the inclination of the plate 23, or to adjust the extent to which the scraper 18 engages the rotary conical heap of powdered coal, or to move the fork lever 12, or to adjust the vertical position of the cylindrical collar 3, or even to more or less close the damper 27; these combinations or some of them being capable of being simultaneously employed.

What I claim is:—

1. In gas generating apparatus, a vertically arranged combustion chamber, a conduit arranged to deliver powdered coal and air to the lower part of said chamber, a reducing column of coke in the path of combustible gases produced in said chamber, means adapted to cause air to enter said conduit, means adapted to deliver a stream of powdered coal in the path of air entering said conduit and means controlled by said means that cause air to enter the said conduit adapted to control the said powdered coal delivery means.

2. In gas generating apparatus, a vertically arranged combustion chamber, a conduit arranged to deliver powdered coal and air to the lower part of said chamber, a reducing column of coke in the path of combustible gases produced in said chamber, a dust chamber arranged to be traversed by gases flowing towards said reducing column, means adapted to cause air to enter said conduit, means adapted to deliver a stream of powdered coal in the path of air entering said conduit and means controlled by said means that cause air to enter the said conduit adapted to control the said powdered coal delivery means.

3. In gas generating apparatus, a combustion chamber, a conduit arranged to deliver powdered coal and air to said chamber, a blower adapted to cause air to enter said conduit, a rotary platform adapted to receive powdered coal driven from said blower, means whereby powdered coal is drawn off said platform as it rotates, and means for leading powdered coal drawn off from said platform in the path of air entering said conduit.

4. In gas generating apparatus, a combustion chamber, a conduit arranged to deliver powdered coal and air to said chamber, a blower adapted to cause air to enter said conduit, a rotary platform adapted to receive powdered coal driven from said blower, a fixed but adjustable scraper adapted to draw powdered coal off said platform as it rotates, and means for leading powdered coal drawn off from said platform in the path of air entering said conduit.

5. In gas generating apparatus, a combustion chamber, a conduit arranged to deliver powdered coal and air to said chamber, a blower adapted to cause air to enter said conduit, a rotary platform adapted to receive powdered coal driven from said blower, means whereby powdered coal is drawn off said platform as it rotates, and an inclined pivoted plate adapted to guide powdered coal drawn off from said platform in the path of air entering said conduit.

6. In gas generating apparatus, a combustion chamber, a conduit arranged to deliver powdered coal and air to said chamber, a blower adapted to cause air to enter said conduit, a rotary platform adapted to receive powdered coal driven from said blower, means whereby powdered coal is drawn off said platform as it rotates, means for leading powdered coal drawn off from said platform in the path of air entering said conduit and a damper adapted to control the mouth of said conduit.

7. In gas generating apparatus, a combustion chamber, a conduit arranged to deliver powdered coal and air to said chamber, a blower adapted to cause air to enter said conduit, a rotary platform adapted to receive powdered coal driven from said blower, a hopper for powdered coal located above said platform, adjustable means for controlling the distance between the exit of said hopper and said platform, means whereby powdered coal is drawn off said platform as it rotates, and means for leading powdered coal drawn off from said platform in the path of air entering said conduit.

8. In gas generating apparatus, a combustion chamber, a conduit arranged to deliver powdered coal and air to said chamber, a blower adapted to cause air to enter said conduit, a rotary platform adapted to receive powdered coal driven from said blower, a hopper for powdered coal located above said platform, a sliding collar on the discharge end of said hopper, means whereby powdered coal is drawn off said platform as it rotates, and means for leading powdered coal drawn off from said platform in the path of air entering said conduit.

9. In gas generating apparatus, a combustion chamber, a conduit arranged to deliver powdered coal and air to said chamber, a blower adapted to cause air to enter said conduit, a rotary platform, a roller adapted to rotate said platform by frictional contact therewith, driving means connecting said roller to said blower, means whereby powdered coal is drawn off said platform as it rotates, and means for leading powdered coal drawn off from said platform in the path of air entering said conduit.

10. In gas generating apparatus, a combustion chamber, a conduit arranged to deliver powdered coal and air to said chamber, means adapted to cause air to enter said conduit, means adapted to deliver a stream of powdered coal in the path of air entering said conduit, and a centrifugal device driven by said means that cause air to enter said conduit adapted to control the said powdered coal delivery means to regulate the distribution of the powdered coal so as to produce only carbonic oxid.

11. In gas generating apparatus, a combustion chamber, a conduit arranged to deliver powdered coal and air to said chamber, a blower adapted to cause air to enter said conduit, a rotary platform adapted to receive powdered coal driven from said blower, a fixed but adjustable scraper adapted to draw powdered coal off said platform as it rotates, an inclined pivoted plate adapted to guide powdered coal drawn off from said platform in the path of air entering said conduit, and a damper adapted to control the mouth of said conduit.

12. In gas generating apparatus, a combustion chamber, a conduit arranged to deliver powdered coal and air to said chamber, a blower adapted to cause air to enter said conduit, a rotary platform adapted to receive powdered coal driven from said blower, a hopper for powdered coal located above said platform, a sliding collar on the discharge end of said hopper, a fixed but adjustable scraper adapted to draw powdered coal off said platform as it rotates, an inclined pivoted plate adapted to guide powdered coal drawn off from said platform in the path of air entering said conduit, and a damper adapted to control the mouth of said conduit.

Signed at Paris, France this fourth day of September 1907.

GEORGES MARCONNET.

Witnesses:
H. C. COXE,
HENRI MONIN.